United States Patent
Hung et al.

(10) Patent No.: US 11,158,866 B2
(45) Date of Patent: Oct. 26, 2021

(54) MICROBIAL FUEL CELL WITH ACTIVATED CARBON ANODE DERIVED FROM WASTE COFFEE GROUND AND METHOD OF MANUFACTURING THE SAME

(71) Applicant: National Tsing Hua University, Hsinchu (TW)

(72) Inventors: Yu-Hsuan Hung, Hsinchu (TW); Han-Yi Chen, Hsinchu (TW); Tzu-Yin Liu, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 170 days.

(21) Appl. No.: 16/595,515

(22) Filed: Oct. 8, 2019

(65) Prior Publication Data

US 2021/0028466 A1    Jan. 28, 2021

(30) Foreign Application Priority Data

Jul. 26, 2019 (TW) .................. 108126520

(51) Int. Cl.
*H01M 8/16* (2006.01)
*H01M 4/90* (2006.01)
*H01M 4/88* (2006.01)

(52) U.S. Cl.
CPC ....... *H01M 4/9083* (2013.01); *H01M 4/8803* (2013.01); *H01M 8/16* (2013.01)

(58) Field of Classification Search
None
See application file for complete search history.

(56) References Cited

U.S. PATENT DOCUMENTS

| 2010/0112380 A1* | 5/2010 | Li ............... H01M 8/16 429/2 |
| 2017/0140881 A1* | 5/2017 | Mitlin .................... H01G 11/26 |
| 2018/0166760 A1* | 6/2018 | Santoro ............... C02F 1/46109 |

FOREIGN PATENT DOCUMENTS

| CN | 102160135 | 8/2011 |
| CN | 107758655 | 3/2018 |
| KR | 20160101811 | 8/2016 |
| KR | 20180038802 | 4/2018 |
| TW | I445237 | 7/2014 |

OTHER PUBLICATIONS

Kemp et al., Activated carbon derived from waste coffee grounds for stable methane storage, Nanotechnology 26 (2015) 385602 (Year: 2015).*

(Continued)

*Primary Examiner* — Lucas J. O'Donnell
(74) *Attorney, Agent, or Firm* — JCIPRNET

(57) ABSTRACT

A microbial fuel cell and a method of manufacturing the same are provided. The microbial fuel cell includes a cathode, an anode, and a microbial community. The anode is made of an activated carbon prepared from waste coffee ground as an electrode material, and the microbial community is adhered to the surface of the activated carbon. Since the activated carbon prepared from waste coffee ground is beneficial for the adhesion of various microbial communities to form a biofilm, the electron transfer efficiency of the microbial fuel cell may be improved.

12 Claims, 10 Drawing Sheets

(56) References Cited

OTHER PUBLICATIONS

Liu et al. Architectural design of hierarchically meso-macroporous carbon for microbial fuel cell anodes; RSC Adv., 2016, 6, 27993-27998. (Year: 2016).*
"Office Action of Taiwan Counterpart Application", dated Jan. 20, 2020, p. 1-p. 6.
Hongying Li, et al., "Power output of microbial fuel cell emphasizing interaction of anodic binder with bacteria", Journal of Power Sources, vol. 379, Jan. 24, 2018, pp. 115-122.
Fei Li, et al., "The construction of rod-like polypyrrole network on hard magnetic porous textile anodes for microbial fuel cells with ultra-high output power density", Journal of Power Sources, vol. 412, Dec. 3, 2018, pp. 514-519.
Yan-Ming Chen, et al., "Application of aluminum-alloy mesh composite carbon cloth for the design of anode/cathode electrodes in *Escherichia coli* microbial fuel cell", International Journal of Hydrogen Energy, vol. 38, Feb. 13, 2013, p. 11131-11137.
Yezhen Zhang, et al., "A graphene modified anode to improve the performance of microbial fuel cells", Journal of Power Sources, vol. 196, Feb. 26, 2011, pp. 5402-5407.
Prateek Khare, et al., "Carbon Nanofiber-skinned Three Dimensional Ni/Carbon Micropillars: High Performance Electrodes of a Microbial Fuel Cell", Electrochimica Acta, vol. 219, Sep. 28, 2016, pp. 88-98.
Tushar Sharma, et al., "Development of carbon nanotubes and nanofluids based microbial fuel cell", International Journal of Hydrogen Energy vol. 33, Oct. 11, 2008, pp. 6749-6754.
Georgepeter Gnana Kumar, et al., "Conductive Polymer/Graphene Supported Platinum Nanoparticles as Anode Catalysts for the Extended Power Generation of Microbial Fuel Cells", Industrial & Engineering Chemistry Research, vol. 53, Oct. 14, 2014, p. 16883-16893.
Shiv Singh, et al., "Candle soot-derived carbon nanoparticles: An inexpensive and efficient electrode for microbial fuel cells", Electrochimica Acta, vol. 264, Jan. 30, 2018, pp. 119-127.
Ali Mehdinia, et al., "Facile microwave-assisted synthesized reduced graphene oxide/tin oxide nanocomposite and using as anode material of microbial fuel cell to improve power generation", International Journal of Hydrogen Energy, vol. 39, Jun. 2, 2014, p. 10724-10730.
Xiaofen Chen, et al. "Porous carbon with defined pore size as anode of microbial fuel cell", Biosensors and Bioelectronics, vol. 69, Feb. 10, 2015, pp. 135-141.
Ali Mehdinia, et al., "Multi-walled carbon nanotube/$SnO_2$ nanocomposite: a novel anode material for microbial fuel cells", Electrochimica Acta, vol. 130, Mar. 15, 2014, pp. 512-518.
G. Gnana Kumar, et al., "Synthesis, Structural, and Morphological Characterizations of Reduced Graphene Oxide-Supported Polypyrrole Anode Catalysts for Improved Microbial Fuel Cell Performances", ACS Sustainable Chemistry & Engineering, vol. 2, Sep. 5, 2014, pp. 2283-2290.
In Ho Park, et al., "Enhanced electrical contact of microbes using $Fe_3O_4$/CNT nanocomposite anode in mediator-less microbial fuel cell", Biosensors and Bioelectronics vol. 58, Feb. 26, 2014, pp. 75-80.
Mengjie Fan, et al., "Different modified multi-walled carbon nanotube-based anodes to improve the performance of microbial fuel cells", International Journal of Hydrogen Energy, vol. 42, Aug. 10, 2017, p. 22786-22795.
Ya-Qiong Wang, et al., "Novelly developed three-dimensional carbon scaffold anodes from polyacrylonitrile for microbial fuel cells", Journal of Materials Chemistry A, vol. 3, Jan. 21, 2015, pp. 5110-5118.
Yanzhen Fan, et al., "Quantification of the Internal Resistance Distribution of Microbial Fuel Cells" Environmental Science & Technology, vol. 42, No. 21, Sep. 24, 2008, pp. 8101-8107.
Miriam Rosenbaum, et al., "Interfacing Electrocatalysis and Biocatalysis with Tungsten Carbide: A High Performance, Noble-Metal-Free Microbial Fuel Cell", Angewandte Chemie International Edition, vol. 45, Sep. 13, 2006, pp. 6658-6661.
Chansoo Choi, et al., "Recovery of silver from wastewater coupled with power generation using a microbial fuel cell", Bioresource Technology, vol. 107, Dec. 16, 2011, pp. 522-525.
Yan Qiao, et al., "A hierarchical porous graphene/nickel anode that simultaneously boosts the bio- and electro-catalysis for high-performance microbial fuel cells", RSC Advances, vol. 4, Apr. 25, 2014, p. 21788-21793.
Da Liu, et al., "Ti3C2 MXene as an excellent anode material for high-performance microbial fuel cells", Journal of Materials Chemistry A, vol. 6, Oct. 8, 2018, p. 20887-20895.

* cited by examiner

MICROBIAL FUEL CELL WITH ACTIVATED CARBON ANODE DERIVED FROM WASTE COFFEE GROUND AND METHOD OF MANUFACTURING THE SAME

CROSS-REFERENCE TO RELATED APPLICATION

This application claims the priority benefit of Taiwan application serial no. 108126520, filed on Jul. 26, 2019. The entirety of the above-mentioned patent application is hereby incorporated by reference herein and made a part of this specification.

BACKGROUND

Technical Field

The disclosure relates to a microbial fuel cell (MFC) technique, and more particularly, to a microbial fuel cell using activated carbon prepared from waste coffee ground as an anode and a method of manufacturing the same.

Description of Related Art

In the crisis of increasing energy shortage, microbial fuel cells are an important direction of energy development. They mainly use the organic matter in the microbial metabolic environment to convert chemical energy into electrical energy, and is an environmentally friendly and sustainable energy source. For example, the biochemical reactions of *Escherichia coli* (*E. coli*) adhered to the anode end with organic matter may produce carbon dioxide, protons, and electrons, wherein the electrons are transmitted to the cathode via an external circuit to form a current, and the electrons and protons reach the cathode end to be combined with oxygen to form water. The reaction formulas are as follows:

Anode: $C_6H_{12}O_6 + 6H_2O \rightarrow 6CO_2 + 24H^+ + 24e^-$ 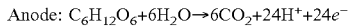

Cathode: $4H^+ + 4e^- + O_2 \rightarrow 2H_2O$ 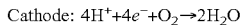

However, microbial fuel cells generally have a problem of low output power. In order to improve output power, currently in the field of microbial fuel cell research, anode materials are mostly high biocompatibility carbon materials used as substrates (such as carbon cloth, graphite felt, carbon paper, graphite fiber, etc.) combined with high conductivity nanomaterials, i.e., expensive materials such as single-walled/multi-walled carbon nanotubes, graphene, etc.

SUMMARY

The disclosure provides a microbial fuel cell capable of reducing cost and increasing current density, thereby increasing output power.

The disclosure further provides a method of manufacturing a microbial fuel cell capable of producing a microbial fuel cell that is low in cost and high in performance.

The microbial fuel cell of the disclosure includes a cathode, an anode, and a microbial community. The anode is made of an activated carbon prepared from a waste coffee ground as an electrode material, and the microbial community is adhered to a surface of the activated carbon.

In an embodiment of the disclosure, the microbial fuel cell may further include a proton exchange membrane disposed between the cathode and the anode.

In an embodiment of the disclosure, the anode further includes a first conductive plate such that the activated carbon is coated on the first conductive plate, and the first conductive plate includes a carbon cloth, a graphite felt, a carbon felt, a graphite paper, a carbon paper, a graphite brush, a carbon brush, a stainless steel mesh, or a foamed nickel.

In an embodiment of the disclosure, the cathode includes a second conductive plate and a carbon material coated on the second conductive plate, wherein the second conductive plate includes a carbon cloth, a graphite felt, a carbon felt, a graphite paper, a carbon paper, a graphite brush, a carbon brush, a stainless steel mesh, or a foamed nickel, and the carbon material includes a carbon nanotube or the activated carbon or the like.

In an embodiment of the disclosure, the microbial community includes *E. coli*, *Shewanella putrefaciens*, or a diverse microbial system in wastewater sludge.

In an embodiment of the disclosure, a power density of the microbial fuel cell is maintained at more than half of an initial power density under conditions of continuous five-day culture and no additional nutrients for next four days.

A method of manufacturing a microbial fuel cell of the disclosure includes the following steps. First, an activated carbon is prepared using a waste coffee ground. The activated carbon is made into an anode. At the same time, a cathode is manufactured and a microbial community is cultured to be adhered to a surface of the anode.

In another embodiment of the disclosure, a method of preparing the activated carbon includes a physical activation method or a chemical activation method.

In another embodiment of the disclosure, the physical activation method includes a water vapor activation method or a carbon dioxide activation method, and the chemical activation method includes activating using a pore-forming agent.

In another embodiment of the disclosure, the pore-forming agent (activator) includes potassium hydroxide (KOH), zinc chloride (ZnCl), or sodium hydroxide (NaOH) or the like.

In another embodiment of the disclosure, a weight ratio of the waste coffee ground to the pore-forming agent is 1:1 to 1:10.

In another embodiment of the disclosure, a carbonization temperature of preparing the activated carbon is 700° C. to 1000° C.

Based on the above, the microbial fuel cell of the disclosure uses the activated carbon prepared from waste coffee ground as the main material of the anode, and since the coffee ground is a waste, the cost is low, and the activated carbon prepared from the waste coffee ground is experimentally found to be beneficial to the adhesion of microbial communities. Therefore, in the application of microbial fuel cells, the activated carbon may improve the efficacy of microbial fuel cells.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
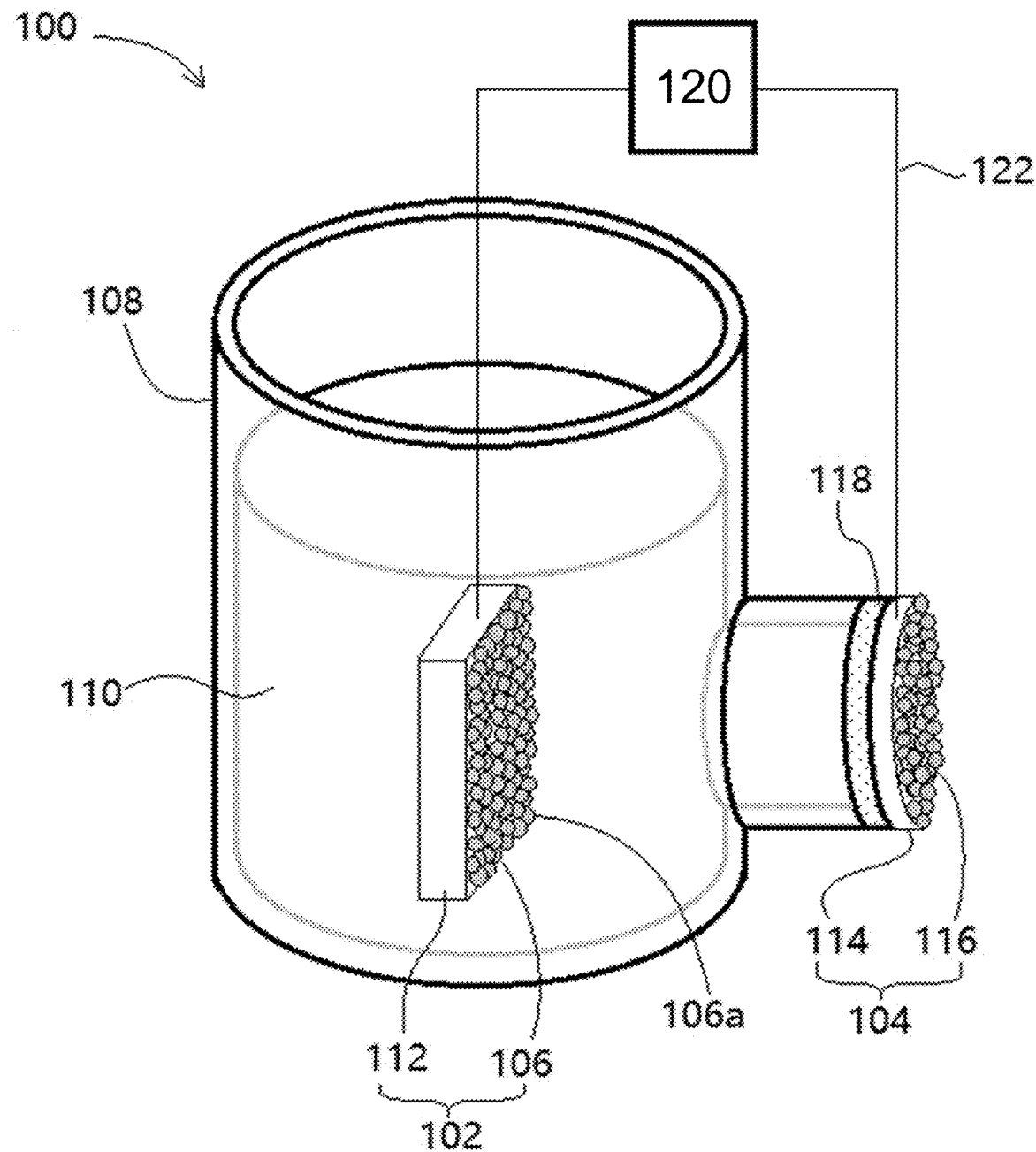
FIG. 1 is a schematic of a microbial fuel cell according to an embodiment of the disclosure.

In the following, exemplary embodiments of the disclosure are comprehensively described with reference to figures, but the disclosure may also be implemented in various different forms and should not be construed as limited to the embodiments of the specification. In the figures, for clarity, the size and thickness of each region, portion, and layer are not shown to actual scale. Moreover, similar or same reference numerals in each of the figures tend to indicate the presence of similar or same devices or features. Similar reference numerals in the figures represent similar devices and descriptions thereof are omitted.

FIG. 1 is a schematic of a microbial fuel cell according to an embodiment of the disclosure.

Referring to FIG. 1, a microbial fuel cell 100 of the present embodiment includes at least an anode 102, a cathode 104, and a microbial community. The anode 102 is made of a coffee-waste-derived activated carbon (CWAC) 106 as an electrode material, and the microbial community is adhered to an activated carbon surface 106a. The microbial community may be applied to a variety of single microbial systems, such as E. coli, Shewanella putrefaciens, etc., or a diverse microbial system in wastewater sludge. Moreover, in order to load an organic matter reacting with the microorganisms, a liquid 110 containing an organic matter is usually loaded using a container 108. The anode 102 further includes an activated carbon 106 and a first conductive plate 112. The activated carbon 106 is coated on the first conductive plate 112, and the first conductive plate 112 is, for example, a carbon cloth, a graphite felt, a carbon felt, a graphite paper, a carbon paper, a graphite brush, a carbon brush, a stainless-steel mesh, or a foamed nickel. The cathode 104 may include a second conductive plate 114 and a carbon material 116. The carbon material 116 is coated on the second conductive plate 114. The second conductive plate 114 is, for example, a carbon cloth, a graphite felt, a carbon felt, a graphite paper, a carbon paper, a graphite brush, a carbon brush, a stainless-steel mesh, or a foamed nickel. The carbon material 116 is, for example, a carbon nanotube or the activated carbon, including commercial activated carbon, waste coffee ground activated carbon, or activated carbon recovered from various biological wastes, etc. In addition, a proton exchange membrane 118 may further be disposed between the cathode 104 and the anode 102. However, the disclosure is not limited thereto. In another embodiment, the microbial fuel cell 100 may also adopt a proton-free exchange membrane design.

In FIG. 1, a microbial community adhered to the activated carbon surface 106a performs biochemical reactions by consuming organic substance in the liquid 110 to produce carbon dioxide, protons, and electrons, wherein the electrons are transferred to the cathode 104 via an external circuit 120 to form a current and is supplied to an external device 122, and the protons reach the cathode 104 via the proton exchange membrane 118. The electrons and protons are combined with external oxygen at the cathode 104 to form water. It is experimentally confirmed that the power density of the microbial fuel cell 100 of the disclosure may be maintained at more than half of the initial power density under the condition of continuous culture for five days and no additional nutrients (i.e., organic matter) for the next four days. Therefore, the microbial fuel cell 100 of the disclosure may be further applied to industries and products such as (1) power supply of small electronic products, (2) power supply of biochips, and (3) wastewater treatment systems. Moreover, according to the International Coffee Organization (ICO) statistics, global coffee consumption reached 9.7 million metric tons in 2018, and the amount of coffee ground waste generated was considerable and even caused a serious environmental burden. Therefore, in the disclosure, waste coffee ground may be recycled and reused as an electrode raw material of the microbial fuel cell 100. Therefore, not only are environmental friendliness and waste recycling achieved, but electrical energy is also generated in combination with microbial technology, which is an important development of sustainable energy conforming to the main points of circular economy.

Figure 2:
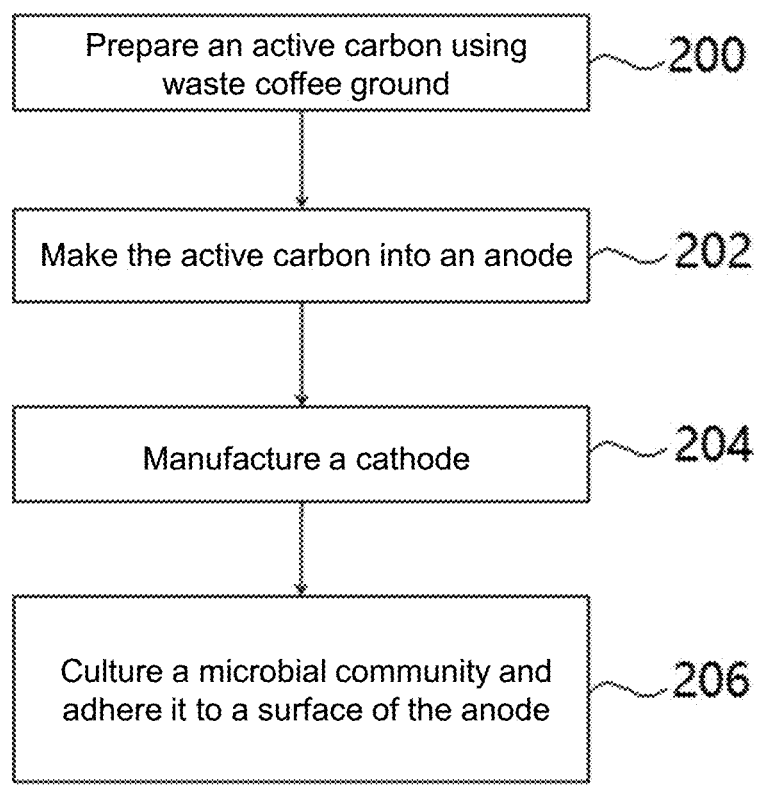
FIG. 2 is a flowchart of the manufacturing process of a microbial fuel cell according to another embodiment of the disclosure.

FIG. 2 is a flowchart of the manufacturing process of a microbial fuel cell according to another embodiment of the disclosure.

Referring to FIG. 2, step 200 is first performed to prepare activated carbon using waste coffee ground. The method of preparing activated carbon is, for example, a physical activation method or a chemical activation method. For example, the physical activation method includes a water vapor activation method or a carbon dioxide activation method, and the chemical activation method includes activating using a pore-forming agent. The pore-forming agent (also referred to as activator) is, for example, potassium hydroxide (KOH), zinc chloride (ZnCl), or sodium hydroxide (NaOH) or the like. In an embodiment, the weight ratio of the waste coffee ground to the pore-forming agent is between 1:1 and 1:10 (such as 1:5), and the carbonization temperature is about 700° C. to 1000° C. The activated carbon obtained in the present embodiment has a high surface area, a porous hole structure, and good electrical conductivity.

Then, step 202 is performed to make the activated carbon prepared from the waste coffee ground into an anode. For example, a suitable proportion by weight of activated carbon, binder (such as a polymer material such as polyvinylidene fluoride (PVDF) and carboxymethyl cellulose (CMC)), and conductive additive (such as a highly conductive material such as carbon black, carbon nanotube, and conductive polymer) may be prepared, wherein the weight ratios of the binder and the conductive additive are similar. Thereafter, the prepared slurry is coated on a conductive plate to be dried and hot pressed to form an anode including the conductive plate and activated carbon, but the disclosure is not limited thereto. In another embodiment, a suitable weight ratio of activated carbon, binder, and conductive additive may be prepared and filled into a can, and the activated carbon obtained after drying may be directly used as an anode.

Next, step 204 is performed to manufacture a cathode. It should be noted that the order of step 202 and step 204 is not limited, and step 202 may be performed first, step 204 may be performed first, or step 202 and step 204 may be performed simultaneously. Moreover, step 202 and step 204 may adopt a similar process. For example, first preparing a suitable weight ratio of carbon material, binder, and conductive additive, and then coating the prepared slurry on a conductive plate to dry to form a cathode including the conductive plate and carbon material. In another embodiment, a suitable weight ratio of carbon material, binder, and conductive additive may be prepared and filled into a can, and the carbon material obtained after drying may be directly used as a cathode. In still another embodiment, the cathode including the conductive plate and the carbon material may be placed on a proton exchange membrane, and a structure including the proton exchange membrane and the cathode may be formed via hot pressing.

Then, step 206 is performed to culture a microbial community to be adhered to a surface of the anode. For example, the anode is placed in a suitable volume ratio of microorganisms, nutrient culture solution, and air for the co-culture of the microbial community. Since activated carbon prepared from waste coffee ground is a porous structure having a high surface area, it is suitable for the adhesion of a microbial community to form a biofilm. Taking *E. coli* as an example, the pore size distribution of activated carbon prepared from waste coffee ground gives the surface thereof a high degree of roughness. As a result, a greater amount of *E. coli* may be adhered than activated carbon prepared from other raw materials, which is beneficial to increasing the current density of the microbial fuel cell.

Experimental examples are described below to verify the efficacy of the disclosure. However, the disclosure is not limited to the following content.

PREPARATION EXAMPLES 1 TO 3

Using saturated KOH as a pore-forming agent, the weight ratio of waste coffee ground to pore-forming agent is 1:1, 1:5, and 1:10, and after filtering, carbonization is performed at a high temperature of 900° C. to form the activated carbons of Preparation examples 1 to 3 to produce pores of different ranges.

COMPARATIVE PREPARATION EXAMPLE 1

As a comparative carbon material, a pore-forming agent was not used, but waste coffee ground of the same weight as in Preparation examples 1 to 3 was directly used for filtering and carbonized at 900° C. to obtain a carbon material.

<BET Analysis>

Figure 3:
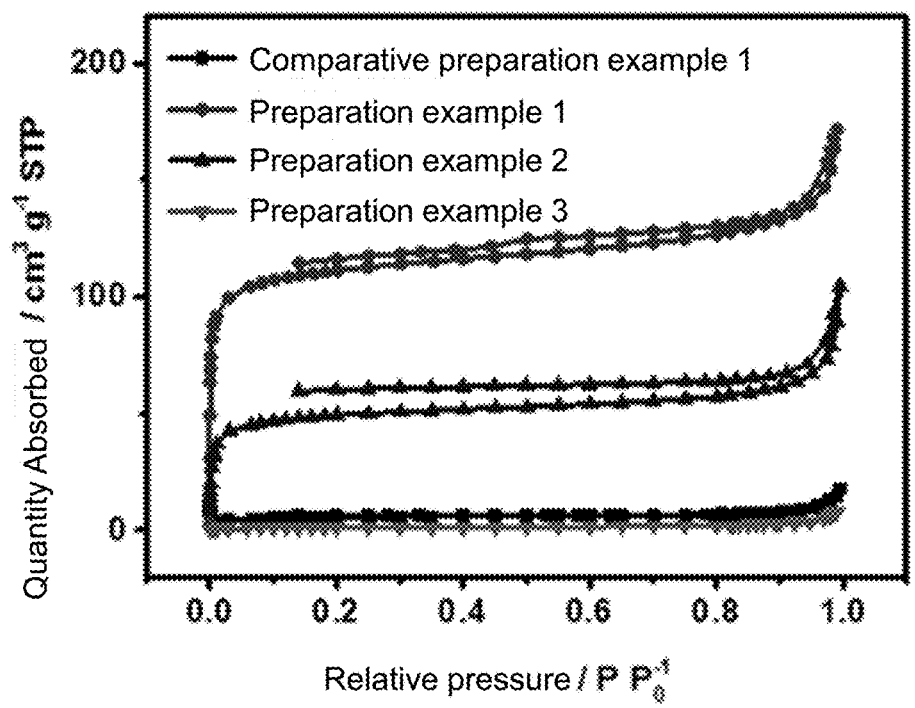
FIG. 3 is a graph of BET specific surface area of Preparation examples 1 to 3 and Comparative preparation example 1.
Figure 4A:
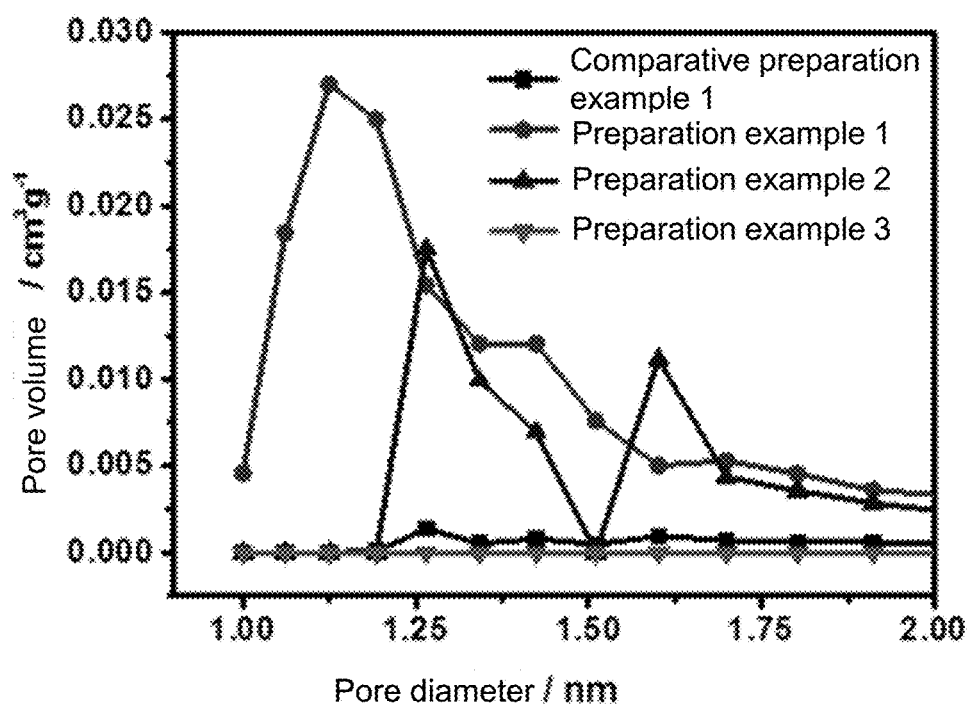
FIG. 4A is a distribution curve of micropores in Preparation examples 1 to 3 and Comparative preparation example 1.
Figure 4B:
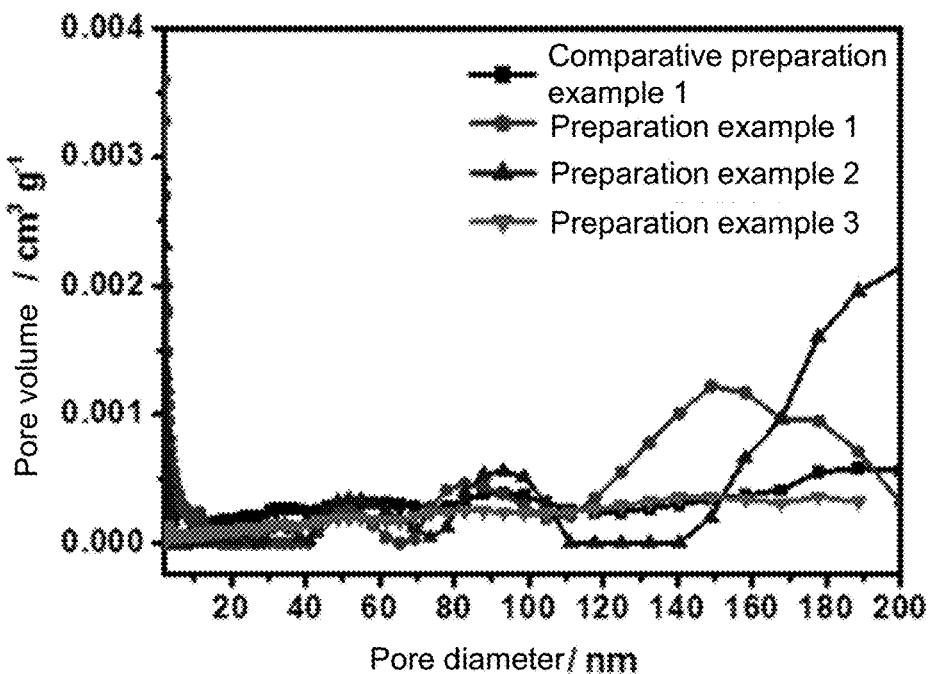
FIG. 4B is a distribution curve of mesopores and macropores of Preparation examples 1 to 3 and Comparative preparation example 1.
Figure 5A:
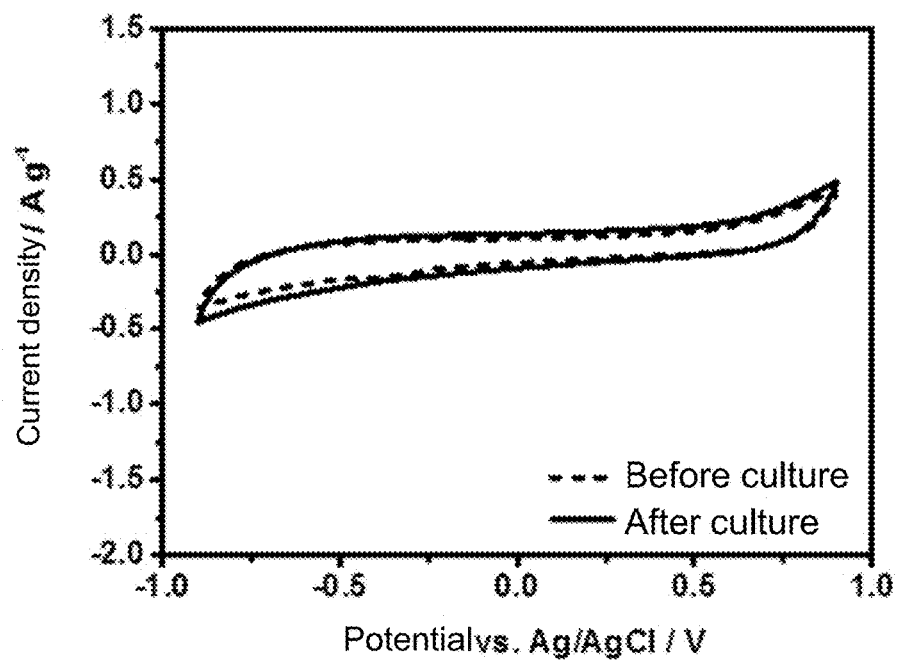
FIG. 5A is a cyclic voltammogram of Comparative preparation example 2.
Figure 5B:
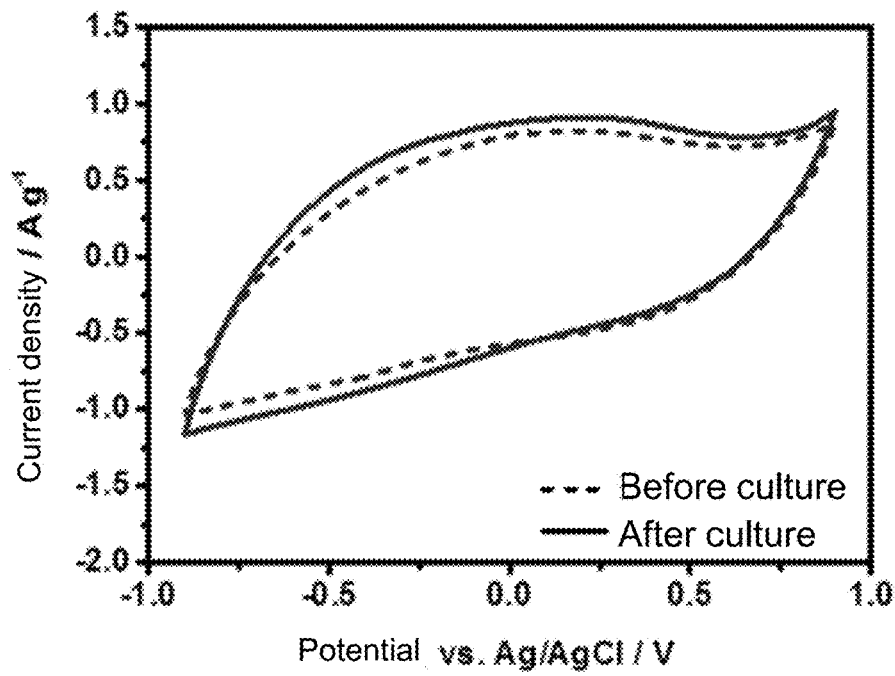
FIG. 5B, FIG. 5C, and FIG. 5D are cyclic voltammograms of Preparation examples 4 to 6, respectively.
Figure 5C:
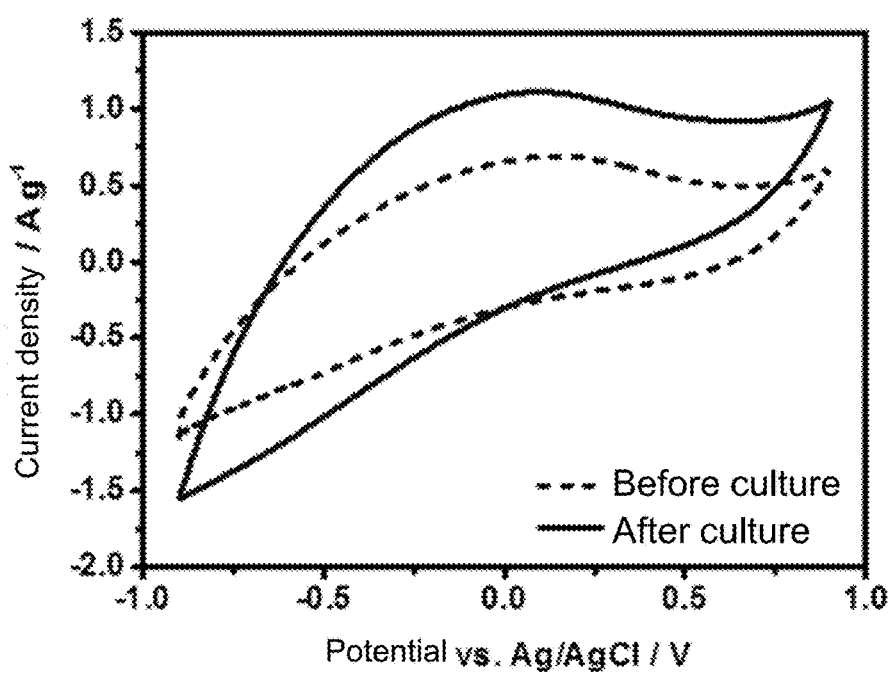
Figure 5D:
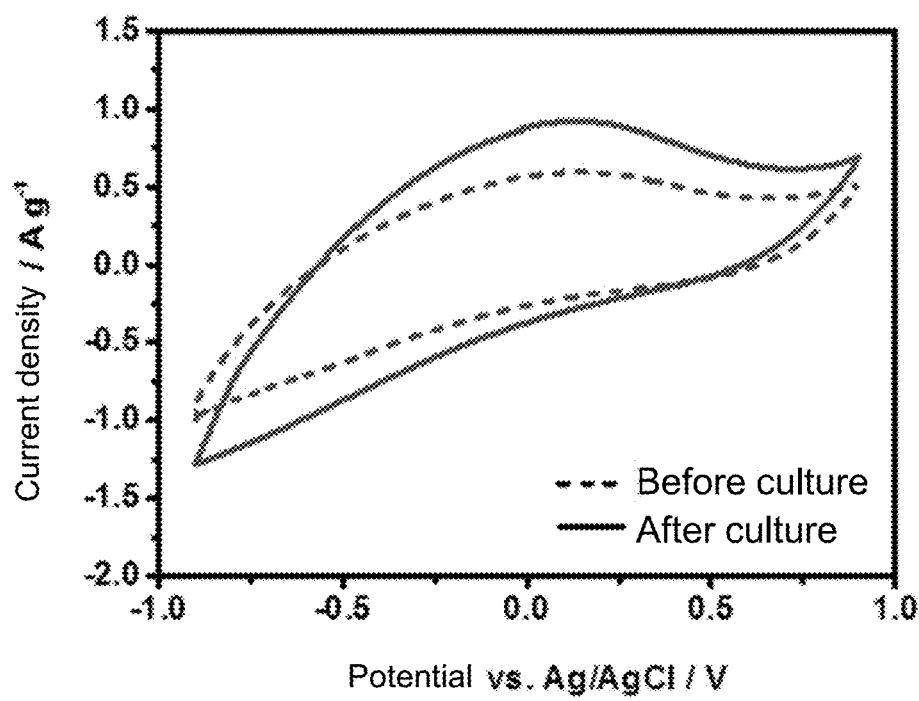
Figure 6A:
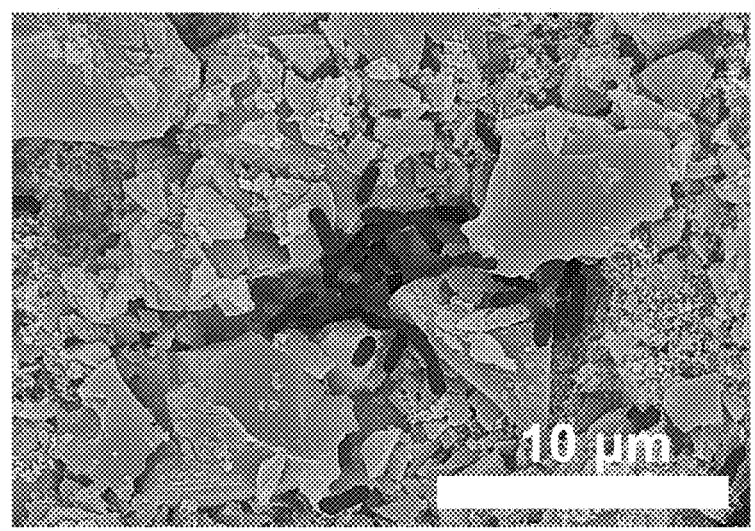
FIG. 6A is a scanning electron micrograph of Comparative preparation example 2.
Figure 6B:
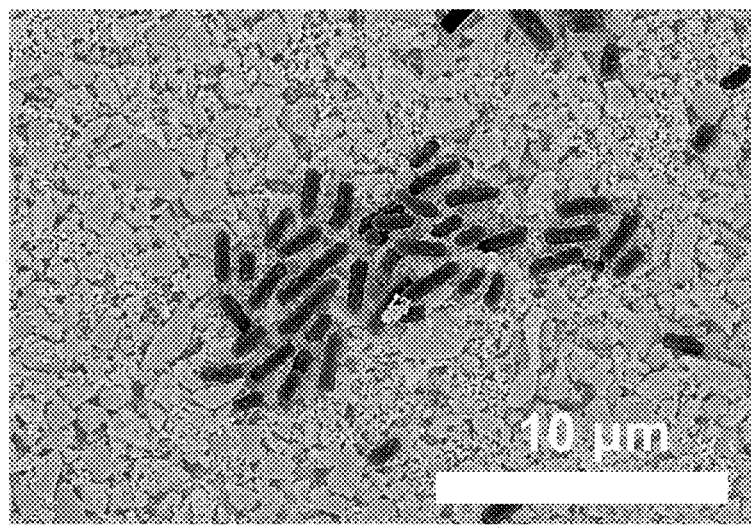
FIG. 6B, FIG. 6C, and FIG. 6D are scanning electron micrographs of Preparation examples 4 to 6, respectively.
Figure 6C:
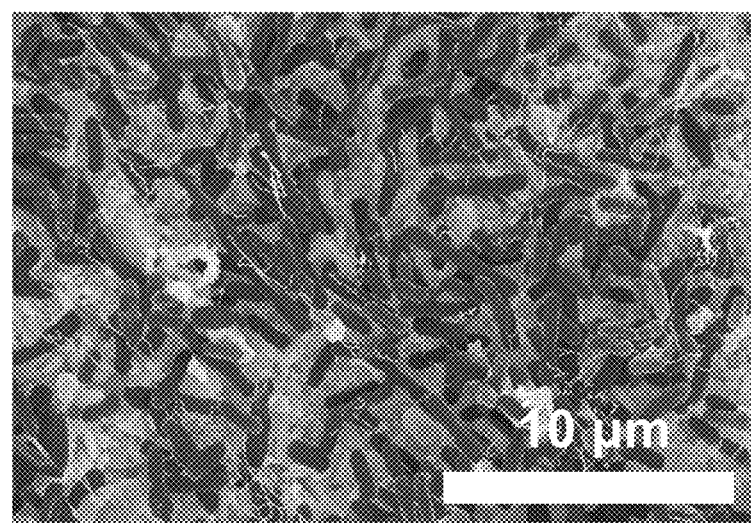
Figure 6D:
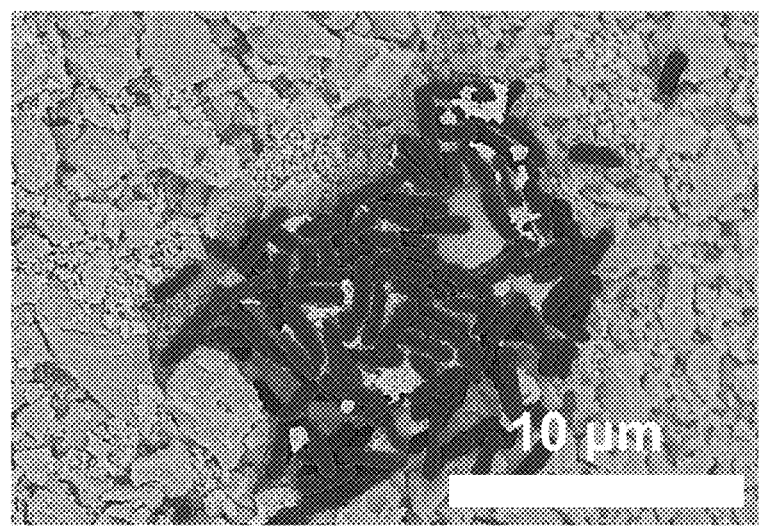

The surface structures of the activated carbons of Preparation examples 1 to 3 and the carbon material of Comparative preparation example 1 were analyzed to obtain the following Table 1, the BET specific surface area curve of FIG. 3, the micropore distribution curve of FIG. 4A, and the distribution curve of mesopores and macropores of FIG. 4B. In particular, micropores refer to pore diameter less than 2 nm, mesopores refer to pore diameter between 2 nm and 50 nm, and macropores refer to pore diameter greater than 50 nm.

TABLE 1

|  | $S_{BET}$ (m²/g) | Average pore diameter (nm) | $V_{macro}$ (cm³/g) | $V_{meso}$ (cm³/g) | $V_{micro}$ (cm³/g) | $V_{total}$ (cm³/g) |
| --- | --- | --- | --- | --- | --- | --- |
| Comparative preparation example 1 | 18.97 | 23.21 | 0.00796 | 0.00734 | 0.00663 | 0.02193 |
| Preparation example 1 | 428.00 | 7.95 | 0.01110 | 0.02239 | 0.14388 | 0.17737 |
| Preparation example 2 | 164.33 | 16.94 | 0.01118 | 0.01042 | 0.05861 | 0.08201 |
| Preparation example 3 | 3.58 | 15.43 | 0.00572 | 0.00516 | 0 | 0.01088 |

$V_{macro}$ refers to the sum of the volume of macropores.
$V_{meso}$ refers to the sum of the volume of mesopores.
$V_{micro}$ refers to the sum of the volume of micropores.
$V_{total}$ refers to the sum of the volume of micropores, mesopores, and macropores.

FIG. 3 shows that the activated carbon of Preparation example 1 has the largest specific surface area. FIG. 4A shows that the activated carbon of Preparation example 1 has more micropores. It may be seen from FIG. 4B that the activated carbon of Preparation example 2 has more large pores.

<Component Analysis>

The activated carbons of Preparation examples 1 to 3 and the carbon material of Comparative preparation example 1 were subjected to Raman analysis and X-ray photoelectron spectroscopy (XPS) analysis, and the results are shown in Table 2 below.

TABLE 2

|  | XPS | | | | | | Raman |
| --- | --- | --- | --- | --- | --- | --- | --- |
| C 1s (%) | C—C | C═C | C—O | C═O | O—C═O | $SP_3/SP_2$ | $I_D/I_G$ |
| Comparative preparation example 1 | 17.68 | 56.1 | 14.38 | 5.43 | 6.41 | 0.315 | 1.24 |
| Preparation example 1 | 22.88 | 48.39 | 15.73 | 8.14 | 4.85 | 0.473 | 1.2 |
| Preparation example 2 | 17.61 | 63.19 | 8.74 | 6.03 | 4.42 | 0.279 | 0.96 |
| Preparation example 3 | 12.97 | 68.61 | 9.1 | 5.48 | 3.84 | 0.189 | 0.94 |

Table 2 shows that the sp² structure of Preparation examples 2 to 3 is greater than 60% and the peak intensity ratio is lower than $I_D/I_G$, meaning the graphite carbon structures of Preparation examples 2 to 3 are more. Therefore, it may be known from the cross-validation of the Raman test and the XPS test that the activated carbons of Preparation examples 2 to 3 have excellent electrical conductivity.

PREPARATION EXAMPLES 4 TO 6

The activated carbon of Preparation example 1, a conductive additive (carbon black), and a binder (polyvinylidene fluoride (PVDF)) were mixed into a slurry at a weight ratio of 80:10:10. The slurry was coated on a 1 cm² conductive plate, and the loading mass was 10 mg/cm². The anode of Preparation example 4 was obtained after drying at 80° C. for 6 hours.

The activated carbons of Preparation examples 2 to 3 were also made into the anodes of Preparation examples 5 to 6 in accordance with the above steps.

COMPARATIVE PREPARATION EXAMPLE 2

The carbon material of Comparative preparation example 1 was subjected to the same steps as in Preparation example 4 to obtain the anode of Comparative preparation example 2.

<Microbial Community Culture>

The anodes of Comparative preparation example 2 and Preparation examples 4 to 6 were placed in different Erlenmeyer flasks respectively, and then E. coli DH5α and Lysogeny broth (LB) were placed in each Erlenmeyer flask. The mixing volume ratio of E. coli, LB, and air was 1:2000:8000, wherein E. coli was 20 μl of E. coli bacterial fluid that was pre-incubated for 16 hours. The incubator was kept at 37° C. and culture was performed by oscillating at 200 rpm for 16 hours.

<Electrochemical Analysis>

The anodes of Comparative preparation example 2 and Preparation examples 4 to 6 after culture, together with the E. coli and LB in the Erlenmeyer flask, were respectively placed in different containers. Electrochemical analysis before and after culture was performed via cyclic voltammetry to obtain the cyclic voltammogram of FIGS. 5A to 5D. At the same time, the surfaces of the anodes of Comparative preparation example 2 and Preparation examples 4 to 6 were observed via a scanning electron microscope to obtain the scanning electron micrographs of FIGS. 6A to 6D.

FIGS. 5A to 5D show that the current density of Comparative preparation example 2 was increased by 24.8%, the current density of Preparation example 1 was increased by 10.5%, the current density of Preparation example 2 was increased by 53.9%, and the current density of Preparation example 3 was increased by 41.7%. It may be known by comparing with FIGS. 6A to 6D that the anodes of Preparation examples 5 to 6 (i.e., activated carbon prepared from waste coffee ground) have a greater amount of E. coli (i.e., dark black strips) adhered to the surface. Especially the surface of the activated carbon of Preparation example 5 has a large amount of E. coli. Compared to the activated carbon of Preparation example 2 of FIG. 4B, the adhesion of E. coli was promoted possibly because of the presence of more large pores.

Figure 7:
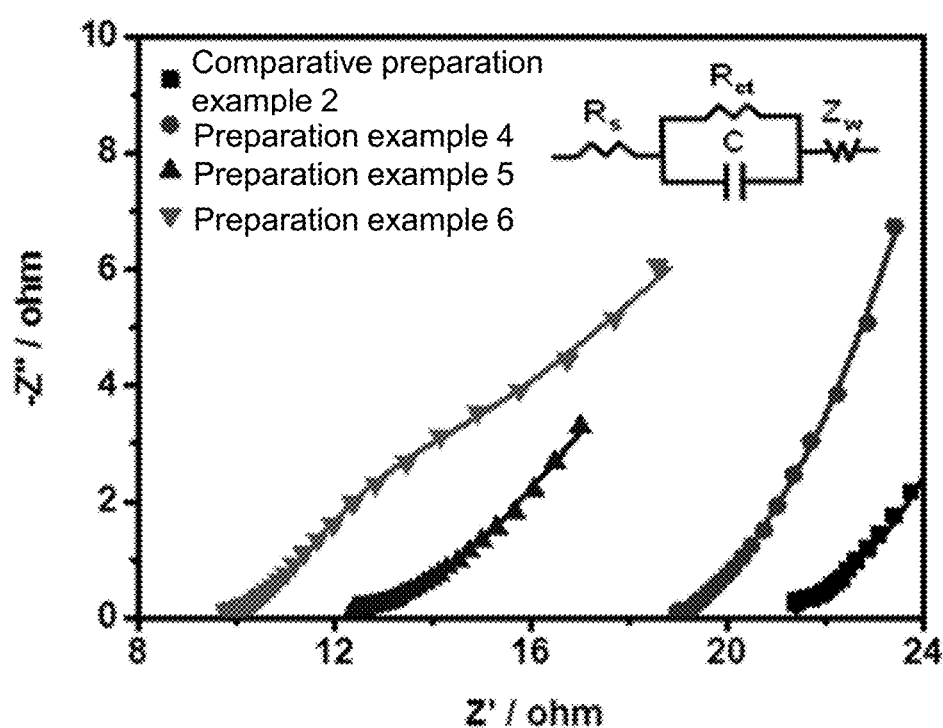
FIG. 7 is a graph of electrochemical impedance spectra (EIS) of Comparative preparation example 2 and Preparation examples 4 to 6.

In addition, the following Table 3 and FIG. 7 were obtained via electrochemical impedance spectra (EIS) analysis. In FIG. 7, $R_s$ refers to equivalent series resistance, $R_{ct}$ refers to charge transfer impedance, C is capacitance, and $Z_w$ refers to Warburg impedance.

TABLE 3

|  | Comparative preparation example 2 | Preparation example 4 | Preparation example 5 | Preparation example 6 |
|---|---|---|---|---|
| $R_s$ (Ω) | 21.25 | 19 | 12.22 | 9.57 |
| $R_{ct}$ (Ω) | 1.53 | 0.67 | 0.19 | 1.08 |

Table 3 and FIG. 7 show that the equivalent series resistance of Preparation example 6 is the smallest, followed by Preparation example 5, and the equivalent series resistance of Comparative preparation example 2 is the largest, which is attributable to the amount of graphite carbon structures in the activated carbon. The charge transfer resistance of Preparation example 5 is the smallest, followed by Preparation example 4, and the charge transfer resistance of Comparative preparation example 2 is the largest, which confirmed that the biofilm composed of E. coli may enhance charge transfer efficiency.

EXPERIMENTAL EXAMPLE 1

First, a commercial activated carbon (Homy graphite, G03-Y200-1K), a conductive additive (carbon black), and a binder (polyvinylidene fluoride (PVDF)) were mixed into a slurry at a weight ratio of 80:10:10. The slurry was coated on a 4 cm² conductive plate, and the loading mass was 10 mg/cm². The cathode after drying at 80° C. for 6 hours was placed on a proton exchange membrane (Nafion 117), and 100 μl of Nafion solution was added and hot pressing was performed at 110° C. for 3 minutes.

Then, the resulting cathode and proton exchange membrane and the anode of Preparation example 4 were assembled into the microbial fuel cell of FIG. 1, wherein LB was used as an organic substance.

EXPERIMENTAL EXAMPLE 2

A microbial fuel cell was manufactured in the same manner as in Experimental example 1, and the anode of Preparation example 4 was changed to the anode of Preparation example 5.

EXPERIMENTAL EXAMPLE 3

A microbial fuel cell was manufactured in the same manner as in Experimental example 1, and the anode of Preparation example 4 was changed to the anode of Preparation example 6.

COMPARATIVE EXAMPLE 1

A microbial fuel cell was manufactured in the same manner as in Experimental example 1, and the anode of Preparation example 4 was changed to the anode of Comparative preparation example 2.

COMPARATIVE EXAMPLE 2

A microbial fuel cell was manufactured in the same manner as in Experimental example 1, and the anode of Preparation example 4 was changed to commercial activated carbon used as an anode.

<Battery Efficiency Analysis>

Figure 8A:
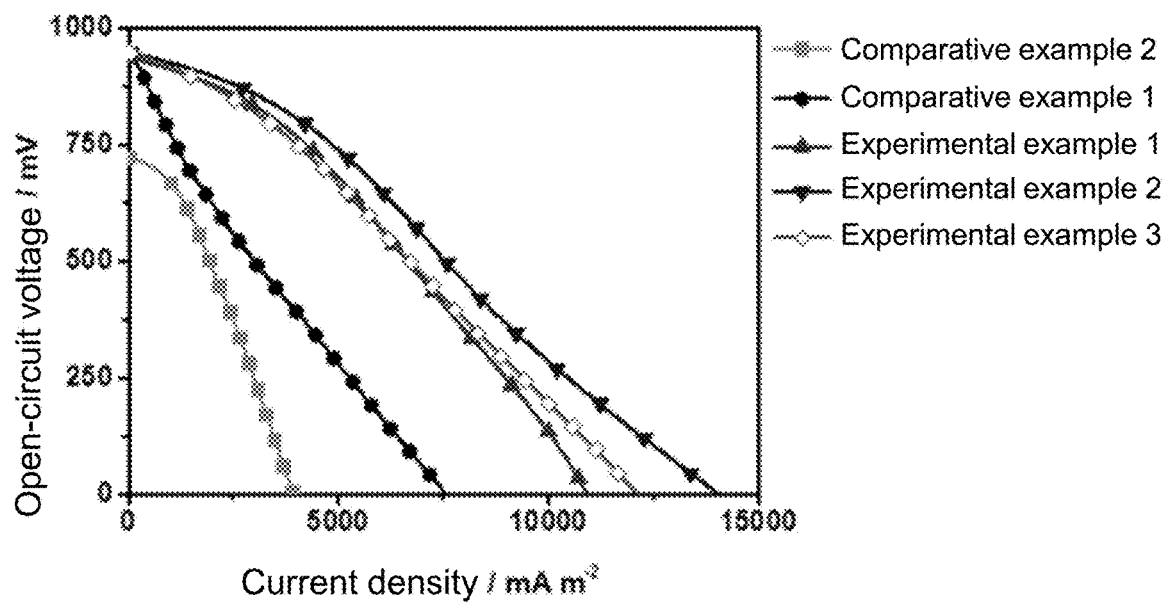
FIG. 8A is a graph of current density and open-circuit voltage of the microbial fuel cells of Experimental examples 1 to 3 and Comparative examples 1 and 2.

The microbial fuel cells of Experimental examples 1 to 3 and Comparative examples 1 and 2 were respectively subjected to linear sweep voltammetry (LSV) analysis to obtain FIG. 8A.

Figure 8B:
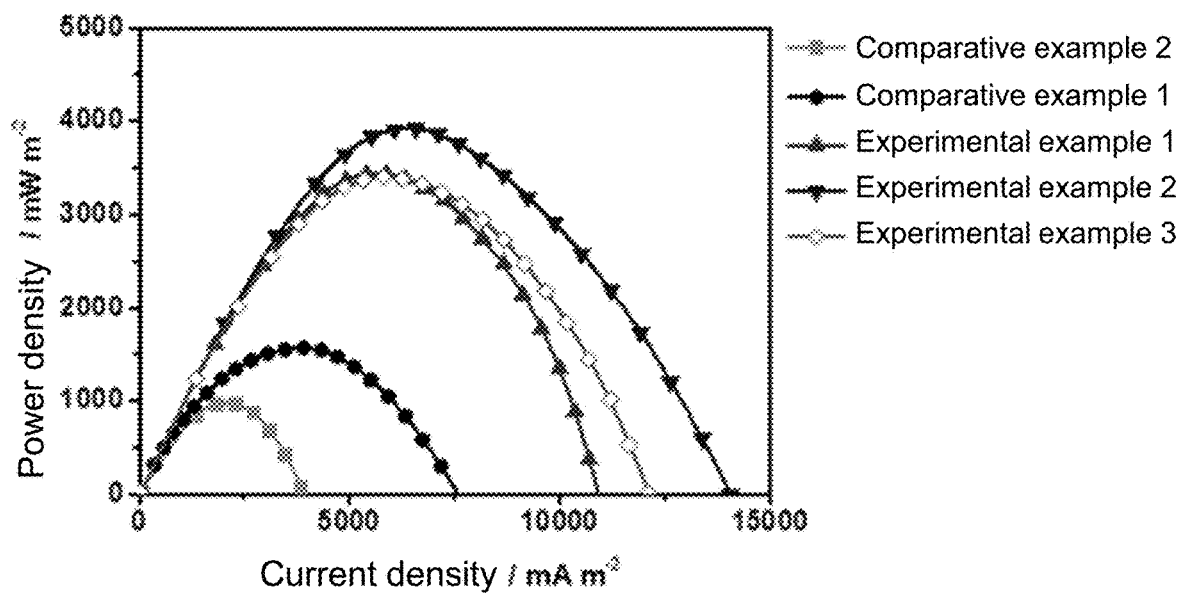
FIG. 8B is a graph of current density and power density of the microbial fuel cells of Experimental examples 1 to 3 and Comparative examples 1 and 2.

Then, calculation was performed according to the numerical values of FIG. 8A to obtain the graph of current density and power density of FIG. 8B, wherein Power density (mW·m$^{-2}$)=Voltage (V)×Current density (mA·m$^{-2}$). The maximum power density values of the batteries of Experimental examples 1 to 3 and Comparative examples 1 and 2 are shown in Table 4 below.

TABLE 4

|  | Comparative example 1 | Comparative example 2 | Experimental example 1 | Experimental example 2 | Experimental example 3 |
| --- | --- | --- | --- | --- | --- |
| Power density (mW · m$^{-2}$) | 1568 | 975 | 3445 | 3927 | 3399 |

As may be seen from Table 4 and FIG. 8B, Experimental examples 1 to 3 all have a power density greater than 3000 mW·m$^{-2}$, and Experimental example 2 manufactured by the anode of Preparation example 5 having the most *E. coli* adhesion has the highest power density.

<Long-Term Battery Testing>

Figure 9A:
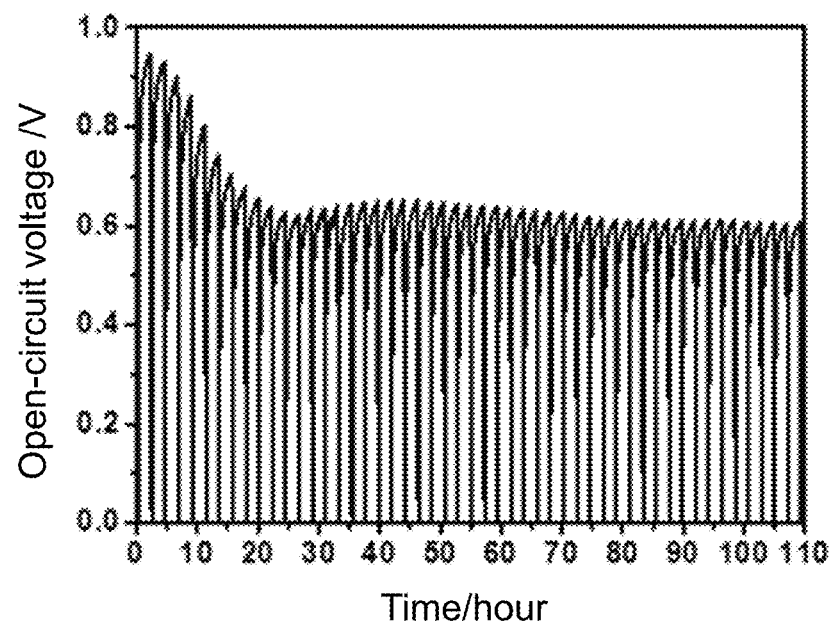
FIG. 9A is a graph of open-circuit voltage of the microbial fuel cell of Experimental example 2 changing with time.

The microbial fuel cell of Experimental example 2 was discharged after the culture, and then the open-circuit voltage thereof was measured after two hours of rest, and the results are shown in FIG. 9A.

FIG. 9A shows the microbial fuel cell of Experimental example 2 is one self-charging system.

Figure 9B:
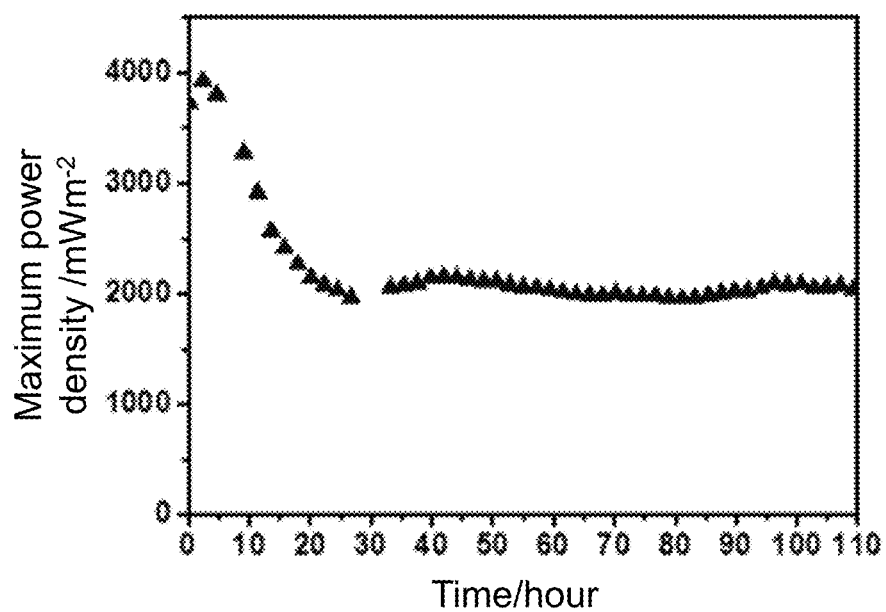
FIG. 9B is a graph of maximum power density of the microbial fuel cell of Experimental example 2 tested over a long period of time.

Then, the microbial fuel cell of Experimental example 2 was tested for maximum power density for a long period of time without continuing to replenish the nutrient solution, and the results are shown in FIG. 9B.

FIG. 9B shows that the microbial fuel cell of Experimental example 2 may still maintain a power of about 2000 mW·m$^{-2}$ after 100 hours. That is, the power density of the microbial fuel cell of the disclosure may be maintained at more than half of the initial power density under the condition that the culture is continued for five days and no additional nutrients are added for the next four days.

Based on the above, in the disclosure, an activated carbon electrode is prepared by recycling the waste of coffee ground and interacting the waste with microorganisms to generate energy. The activated carbon is applied to a microbial fuel cell and has the effects of low cost and high efficiency. Since the microbial fuel cell of the disclosure is low in cost and has high power density, it is expected to be applicable to (1) power supply of small electronic products; (2) power supply of biochips; and (3) wastewater treatment systems and the like.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A microbial fuel cell, comprising:
    a cathode;
    an anode made from an activated carbon prepared from a waste coffee ground as an electrode material, wherein a sum of a volume of macropores of the activated carbon is greater than a sum of a volume of mesopores of the activated carbon, the mesopores refer to a pore diameter between 2 nm and 50 nm, and the macropores refer to a pore diameter greater than 50 nm; and
    a microbial community adhered to a surface of the activated carbon.

2. The microbial fuel cell of claim 1, further comprising a proton exchange membrane disposed between the cathode and the anode.

3. The microbial fuel cell of claim 1, wherein the anode further comprises a first conductive plate and an activated carbon material is coated on the first conductive plate, and the first conductive plate comprises a carbon cloth, a graphite felt, a carbon felt, a graphite paper, a carbon paper, a graphite brush, a carbon brush, a stainless steel mesh, or a foamed nickel.

4. The microbial fuel cell of claim 1, wherein the cathode comprises a second conductive plate and a carbon material coated on the second conductive plate, and the second conductive plate comprises a carbon cloth, a graphite felt, a carbon felt, a graphite paper, a carbon paper, a graphite brush, a carbon brush, a stainless steel mesh, or a foamed nickel, and the carbon material comprises a carbon nanotube or an activated carbon.

5. The microbial fuel cell of claim 1, wherein the microbial community comprises *E. coli, Shewanella putrefaciens*, or a diverse microbial system in wastewater sludge.

6. The microbial fuel cell of claim 1, wherein a power density of the microbial fuel cell is maintained at more than half of an initial power density under conditions of continuous five-day culture and no additional nutrients for next four days.

7. A method of manufacturing a microbial fuel cell, comprising:
    preparing an activated carbon using a waste coffee ground, wherein a sum of a volume of macropores of the activated carbon is greater than a sum of a volume of mesopores of the activated carbon, the mesopores refer to a pore diameter between 2 nm and 50 nm, and the macropores refer to a pore diameter greater than 50 nm;
    making the activated carbon into an anode;
    making a cathode; and
    culturing a microbial community to be adhered to a surface of the anode.

8. The method of manufacturing the microbial fuel cell of claim 7, wherein a method of preparing the activated carbon comprises a physical activation method or a chemical activation method.

9. The method of manufacturing the microbial fuel cell of claim 8, wherein the physical activation method comprises a water vapor activation method or a carbon dioxide activation method, and the chemical activation method comprises activating using a pore-forming agent.

10. The method of manufacturing the microbial fuel cell of claim 9, wherein the pore-forming agent comprises potassium hydroxide (KOH), zinc chloride (ZnCl), or sodium hydroxide (NaOH).

11. The method of manufacturing the microbial fuel cell of claim 9, wherein a weight ratio of the waste coffee ground to the pore-forming agent is 1:1 to 1:10.

12. The method of manufacturing the microbial fuel cell of claim 8, wherein a carbonization temperature of preparing the activated carbon is 700° C. to 1000° C.

\* \* \* \* \*